Nov. 14, 1944.  E. W. VARS  2,362,681

CLASP

Filed Sept. 5, 1941

Ethan W. Vars
INVENTOR

BY
ATTORNEYS

Patented Nov. 14, 1944

2,362,681

UNITED STATES PATENT OFFICE 2,362,681

CLASP

Ethan W. Vars, Bellefonte, Pa.

Application September 5, 1941, Serial No. 409,674

7 Claims. (Cl. 24—87)

The present invention is designed to provide a clasp which may be readily attached and still provide a secure attachment.

In accomplishing this purpose, pivotally mounted hooks are provided which, in swinging, enter into or pass through the material to which the clasp is attached, thus securing the clasp in place. Preferably the hooks are swung by a lever and preferably the lever is arranged so that it can be folded into position adjacent to the hook mounting and yieldingly lock and definitely secure the hook. If desired, the hook mounting may be housed in a cover plate which may be ornamental.

Features and details of the invention will appear from the specification and claims.

Figure 1:
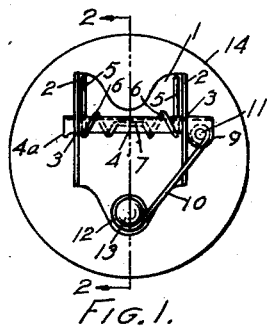

Preferred embodiments of the invention are illustrated in the accompanying drawing as follows:

Fig. 1 shows a rear view of the clasp.

Figure 2:
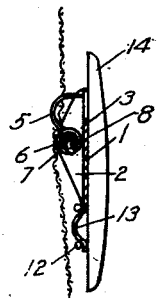

Fig. 2 a section on the line 2—2 in Fig. 1.

Figure 3:
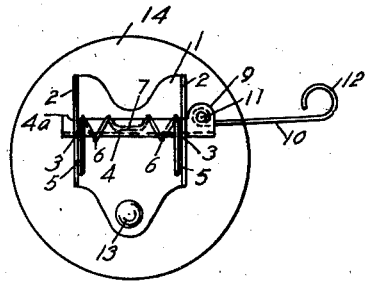

Fig. 3 is a view similar to Fig. 1 with the hooks in open position.

Figure 4:
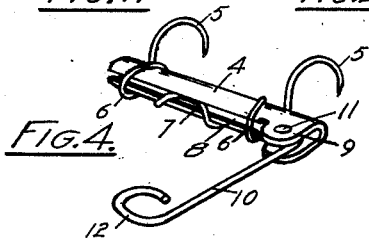

Fig. 4 a perspective view of the hooks and lever attached.

Figure 5:
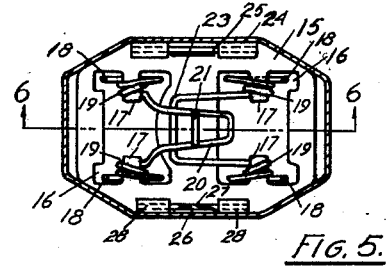

Fig. 5 a rear view of an alternative construction.

Figure 6:
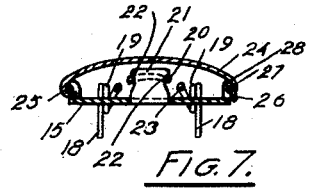

Fig. 6 a section on the line 6—6 in Fig. 5.

Figure 7:
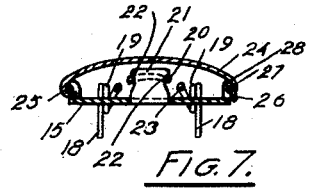

Fig. 7 a section on the line 7—7 in Fig. 6.

In the structure shown in Figs. 1 to 4 inclusive, 1 marks a back plate. This is provided with flanges 2, the flanges having perforations 3. A rock shaft 4 is preferably formed of a fold of sheet metal. Hooks 5 have loops 6 and connecting portions 7 which are adapted to slide over the shaft 4 with the connecting portion 7 extending into the space 8 between the sides of the fold of the shaft. Thus the hook is definitely secured and locked against turning with relation to the shaft.

In assembling the shaft and hooks, the shaft is passed through the opening 3 in one flange, then through the loops of the hooks and then through the opening of the opposite flange. The ends of the shaft are then spread at 4a, securing it in the flange.

Ears 9 are formed at one end of the shaft 4 and a lever 10 is mounted between the ears 9 and pivotally secured by a pin 11. The outer end of the lever has a loop 12 which is adapted to spring over a detent 13 formed in the back plate so as to yieldingly lock the lever with the hooks in engaging position.

In operation, the plate is placed against the fabric or material to which it is to be attached with the lever swung to bring the hooks into open position. The lever is then swung over so as to swing the hooks, the curve of the hooks carrying them into or through the material. In the final position the lever is adjacent to the plane of the back plate. The lever is then swung so as to engage the detent and thus lock the lever in set position.

A cover plate 14 may be secured to the back plate. This may be ornamental if desired, or it may have identification numbers or any insignia upon it.

It will be noted that this arrangement provides a means by which the clasp may be readily operated in attaching it or detaching it and that the clasp is definitely secured in place when it is attached.

In the alternative construction, Figs. 5 to 7, a back plate 15 is provided with openings 16 into which pivot projections 17 extend, these projections being merely stamped out portions of the back plate 15. Preferably there are two of the openings 16 and two pairs of the projections 17. Hooks 18 are provided with loops 19, the loops being adapted to be sprung over the projections 17 forming a pivotal mounting for the hooks. The wire of one pair of hooks is connected by a lever 20 which is in the form of a loop. As the lever is swung to set position, the sides of the loop straddle a locking post 21, the post spreading the sides of the loop which enter depressions 22 when in set position, thus yieldingly locking the lever. The companion pair of hooks are connected by a lever loop 23 which is adapted to be swung down under the lever 20 so that the locking of the lever 20 locks the lever 23 and consequently the companion set of hooks.

In this structure it will be noted that the lever mechanism is on the exposed side of the back plate or opposite the material into which the hooks are forced so that the levers are readily accessible for operating the hooks.

A cover plate 24 has a hinge connection 25 with the back plate. A lip 26 on the opposite side of the cover plate engages a pin 27. The pin is secured in sleeves 28 struck up in the back plate. As the cover plate is closed on the back plate, the lip yields to pass over the pin and yieldingly locks the cover plate in closed position on the back plate.

What I claim as new is:

1. In a clasp, the combination of a back plate, two pairs of hooks pivotally mounted on the back plate, levers actuating the hooks, means securing the levers with the hooks in engaged position, a cover plate secured to the back plate and housing the levers between the cover plate and back plate, and releasable connections between the cover plate and back plate permitting access to the back of the back plate.

2. In a clasp, the combination of a back plate, a shaft rotatively mounted thereon, said rock shaft formed of folded sheet material, a pair of wire hooks mounted on the rock shaft, said hooks being spaced apart by means of loops and connecting portions, the connecting portions projected between the folds of the rock shaft, and a lever pivotally connected on said rock shaft for rotating the rock shaft and hooks.

3. In a clasp, the combination of a back plate, a shaft rotatively mounted thereon, said rock shaft formed of folded sheet material, a pair of wire hooks mounted on the rock shaft, said hooks being spaced apart by means of loops and connecting portions, the connecting portions projected between the folds of the rock shaft, a lever pivotally connected on said rock shaft for rotating the rock shaft and hooks, and means for securing the lever and hooks in engaged position.

4. In a clasp, the combination of a back plate, a rock shaft rotatively mounted thereon, a pointed hook fixed to said rock shaft and movable therewith, the point being directed toward the plate and adapted to penetrate and secure the material to the plate when the hook is swung toward and into closed position through rotation of the rock shaft, and a lever pivoted to said rock shaft with the axis of the pivot at an angle to the axis of the shaft and the lever positioned transverse to the shaft and between the material and the plate in the closed position of the hook, said pivot permitting the outswinging of the lever to a position projecting beyond the plate to place it in operative position for rotating the shaft and hook.

5. In a clasp, the combination of a back plate, a rock shaft rotatively mounted thereon, a pointed hook fixed to said rock shaft and movable therewith, the point being directed toward the plate and adapted to penetrate and secure the material to the plate when the hook is swung toward and into closed position through rotation of the rock shaft, a cover plate for the back plate, a lever pivoted to said rock shaft with the axis of the pivot at an angle to the axis of the shaft and the lever positioned transverse to the shaft and beneath said plates in the closed position of the hook, said pivot permitting the outswinging of the lever to a position projecting beyond the plates to place it in operative position for rotating the shaft and hook, and means beneath said plates for locking the lever, and with it the hook, in engaged position.

6. In a clasp, the combination of a back plate, a rock shaft rotatively mounted thereon, a pointed hook fixed to said rock shaft and movable therewith, the point being directed toward the plate and adapted to penetrate and secure the material to the plate when the hook is swung toward and into closed position through rotation of the rock shaft, and a lever pivoted to said rock shaft with the axis of the pivot at an angle to the axis of the shaft and the lever positioned transverse to the shaft and between the material and the plate in the closed position of the hook, said pivot permitting the outswinging of the lever to a position projecting beyond the plate to place it in operative position for rotating the shaft and hook, and a detent on the plate locking the lever and hook in closed position.

7. In a clasp, the combination of a back plate, a pair of pointed wire hooks, means for rotatively mounting the hooks on the plate with the points directed toward the plate, said hooks being connected by means of wire connecting portions coiled around the rotative axis of the hooks, said connecting portions having a loop receiving a force for swinging the hooks into and out of closed position.

ETHAN W. VARS.